United States Patent [19]

Horiuchi et al.

[11] Patent Number: 4,745,816
[45] Date of Patent: May 24, 1988

[54] LUBRICATION MECHANISM OF GEAR TRANSMISSION

[75] Inventors: Yusuke Horiuchi; Masaki Inui; Shinji Ogawa, all of Toyota, Japan

[73] Assignee: Toyota Jidosha Kabushiki Kaisha, Aichi, Japan

[21] Appl. No.: 99,625

[22] Filed: Sep. 22, 1987

Related U.S. Application Data

[63] Continuation of Ser. No. 844,543, Mar. 27, 1986, abandoned.

[30] Foreign Application Priority Data

Apr. 1, 1985 [JP]  Japan ............................ 60-48273[U]

[51] Int. Cl.$^4$ ............................................. F16H 57/04
[52] U.S. Cl. ...................................... 74/467; 184/6.12
[58] Field of Search .................... 74/467, 408, 606 R; 184/11.2, 11.1, 6.12, 6.27

[56] References Cited

U.S. PATENT DOCUMENTS

| | | | |
|---|---|---|---|
| 1,220,810 | 3/1917 | Alquist | 74/467 |
| 1,402,281 | 1/1922 | Brockway | 184/11.1 |
| 1,554,081 | 9/1925 | Garrett | 74/467 |
| 1,970,385 | 8/1934 | Maybach | 184/6.12 |
| 2,602,522 | 7/1952 | Roos | 184/11.1 |
| 3,006,438 | 10/1961 | Molinaro | 184/6.12 |
| 3,601,515 | 8/1971 | Pelizzoni | 74/467 |

FOREIGN PATENT DOCUMENTS

| | | | |
|---|---|---|---|
| 52-32675 | 3/1977 | Japan . | |
| 0951364 | 3/1964 | United Kingdom | 184/6.12 |

*Primary Examiner*—Kenneth J. Dorner
*Assistant Examiner*—Gerald Anderson
*Attorney, Agent, or Firm*—Parkhurst & Oliff

[57] ABSTRACT

Disclosed herein is a lubrication mechanism in a parallel dual-shaft type gear transmission which includes intermediate plate arranged between a transmission case and an extension housing and an output shaft and a counter shaft arranged in parallel relation in the transmission case. The lubrication mechanism comprises an oil guiding rib formed along an outer circumference of a small diametrical counter gear arranged in the vicinity of the intermediate plate. With this arrangement, a lubricating oil may be sufficiently supplied to desired areas in the gear transmission by means of a small diametrical counter gear.

4 Claims, 2 Drawing Sheets

LUBRICATION MECHANISM OF GEAR TRANSMISSION

This is a continuation of application Ser. No. 844,543, filed Mar. 27, 1986, now abandoned.

BACKGROUND OF THE INVENTION

This invention relates to a lubrication mechanism in a parallel dual-shaft type gear transmission having an intermediate plate arranged between a transmission case and an extension housing.

Generally, in a parallel dual-shaft type gear transmission, a lubricating oil stored in the transmission case is lifted by the rotation of counter gears mounted on a counter shaft arranged at a lower portion of the transmission case, and is supplied to desired areas to be lubricated. A small diametrical gear, normally a first counter gear of the counter gears, may lift a small amount of the lubricating oil, thereby reducing the lubricating effect to the area to be lubricated accordingly.

To cope with this insufficient lubrication by the prior art, the amount of lubricating oil in the transmission case is increased or a special part such as an oil receiver is used. Further, there is described in Japanese Utility Model Laid-open No. 52-32675, a multiple oil passage formed in the intermediate plate arranged between the transmission case and the extension housing, so as to facilitate the supply of lubricating oil to areas where insufficient lubrication occurs.

In the aforementioned prior art, it is required to increase the amount of the lubricating oil or additionally provide a special part such as an oil receiver. In another case, considerable modification of the intermediate plate is required. As a result, the gear transmission is complicated in structure, and manufacturing costs are increased.

SUMMARY OF THE INVENTION

Accordingly, it is an object of the present invention to provide a lubrication mechanism of a gear transmission which may sufficiently and effectively supply a lubricating oil to desired areas in the gear transmission through the use of a small diametrical counter gear to avoid any partial lack of lubrication and improve general lubricating performance.

It is another object of the present invention to provide a lubrication mechanism of a gear transmission which eliminates the necessity for increased amounts of lubricating oil in the transmission case and avoids the necessity of additional parts such as an oil receiver, thereby reducing manufacturing costs.

According to the present invention, in a parallel dual-shaft type gear transmission which includes an intermediate plate arranged between a transmission case and an extension housing, an output shaft provided in the transmission case and a counter shaft arranged in parallel relation with the output shaft in the transmission case, there is provided a lubrication mechanism of the gear transmission comprising an oil guiding rib formed along an outer circumference of a small diametrical counter gear arranged in the vicinity of the intermediate plate. With this arrangement, the lubricating oil lifted by the rotation of the small diametrical counter gear is allowed to pass through an oil passage defined between the outer circumference of the counter gear and the oil guiding rib, and is effectively supplied to any desired areas in the gear transmission without being scattered to any undesired areas. As a result, it is possible to maintain satisfactory lubrication in the gear transmission by means of the small diametrical counter gear.

BRIEF DESCRIPTION OF THE DRAWINGS

The invention will be more fully understood from the following detailed description and appended claims when taken with reference to the drawings, of which:

DETAILED DESCRIPTION OF THE PREFERRED EMBODIMENT

Figure 1:
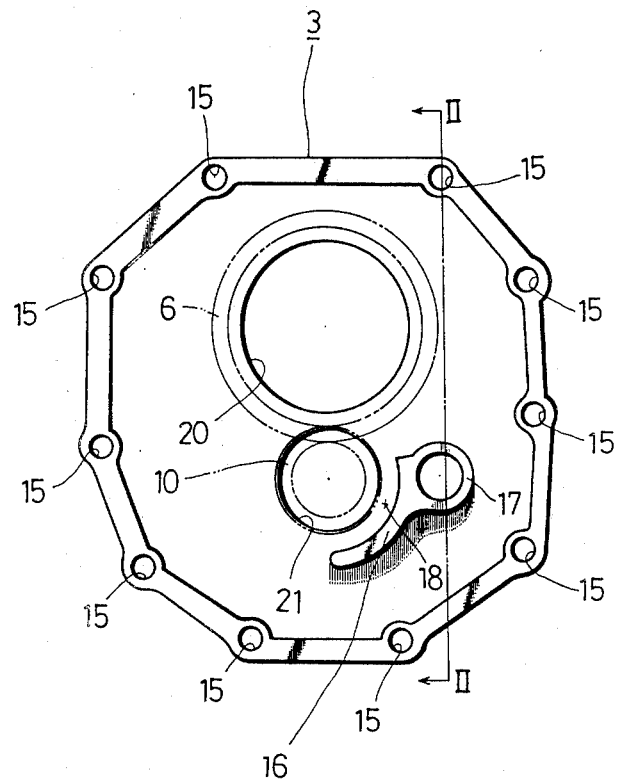
FIG. 1 is a front view of an intermediate plate in a preferred embodiment of the invention.
Figure 2:
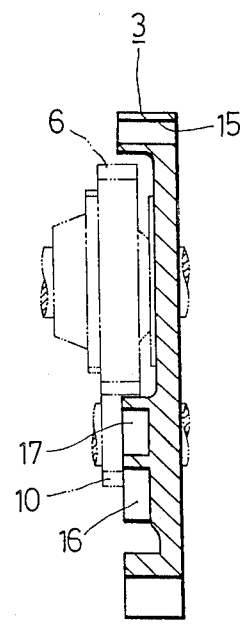
FIG. 2 is a cross-section taken along the line II—II in FIG. 1.

Referring to FIGS. 1 and 2, a plurality of bolt holes 15 are formed through an outer circumferential portion of the intermediate plate 3 so as to insert the bolts 13, thereby combining the intermediate plate 3 with the transmission case 1 and the extension housing 2. The intermediate plate 3 is further equipped with through-holes 20 and 21 to be engaged with the respective outer edges of the ball bearing 5 and the roller bearing 12. In the vicinity of the through-hole 21, an oil guiding rib 16 is formed intergrally with the intermediate plate 3 along the outer circumference of the first counter gear 10. With this structure, there is defined a nozzle-like oil passage 18 between the oil guiding rib 16 and the outer circumference of the first counter gear 10. Reference numeral 17 designates a shaft support boss for a reverse idler gear shaft (not shown), the boss being projected from the intermediate plate 3. The oil guiding rib 16 is extended from the shaft support boss 17 so as to effectively utilize space in the transmission case 1.

Figure 3:
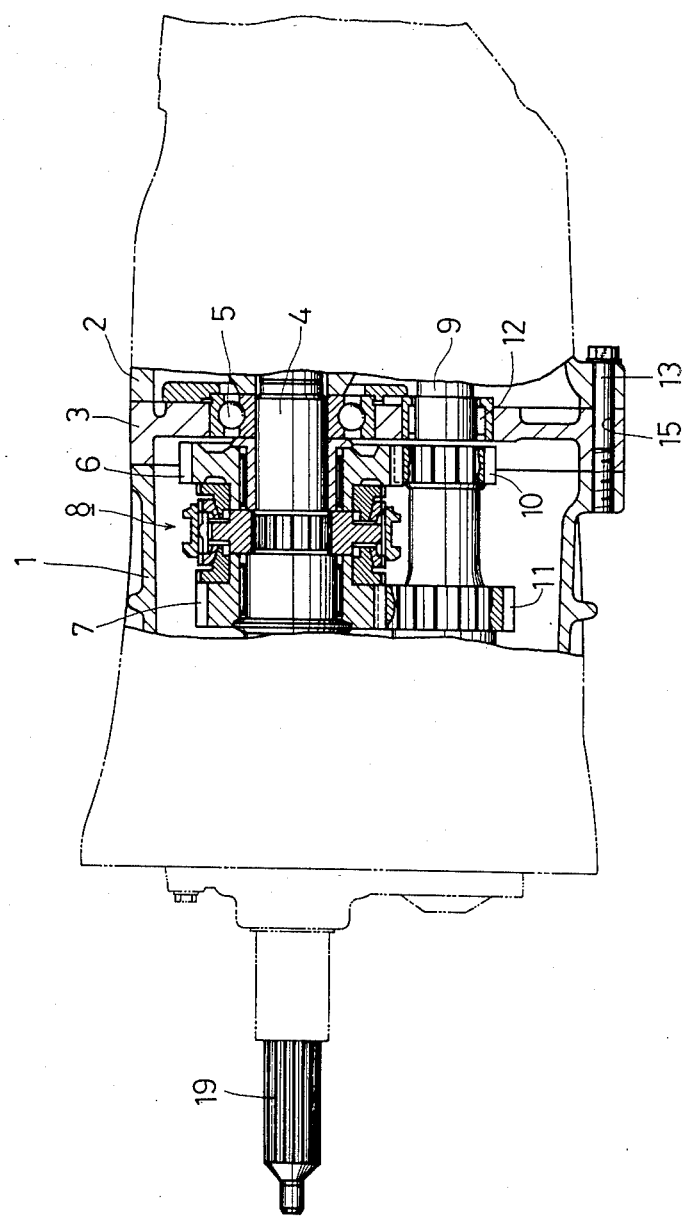
FIG. 3 is a partially sectional view of the gear transmission of the invention.

In FIG. 3 there is shown a gear transmission in which an intermediate plate 3 is arranged between a transmission 1 and an extension housing 2. The transmission case 1, the intermediate plate 3 and the extension housing 2 are combined by means of a plurality of bolts 13 at their outer circumferential portions. In the transmission case 1 and the extension housing 2, there are rotatably supported an output shaft 4 arranged coaxially with an input shaft 19 of a gear transmission and a counter shaft 9 arranged below and parallel to the output shaft 4. The output shaft 4 and the counter shaft 9 are supported by a plurality of bearings which are axially arranged. For purposes of simplicity, there is shown in FIG. 3 a ball bearing 5 for supporting the output shaft 4 to the intermediate plate 3 and a roller bearing 12 for supporting the counter shaft 9 to the intermediate plate 3.

Although various speed change gears are mounted to the output shaft 4 in the transmission case 1, there are shown in FIG. 3 a first gear 6 and a second gear 7 freely and rotatably supported by the output shaft 4. A known synchromesh mechanism 8 is provided on the output shaft 4 between the first gear 6 and the second gear 7. The synchromesh mechanism 8 functions to selectively rotate the first gear 6 and the second gear 7 via the output shaft 4 by changing the speed operation of the gear transmission.

Although various counter gears are integrally formed with the counter shaft 9 in the transmission case 1, there are shown in FIG. 3 a first counter gear 10 meshed with the first gear 6 and a second counter gear 11 meshed with the second gear 7. A lubricating oil is stored in the transmission case 1, and is supplied to an upper area in the transmission case 1 by an oil lifting action of the counter gears 10, 11 which is accompanied by a rotation of the counter shaft 9. As a reslt, meshing portions between the speed change gears, counter gears and other areas are lubricated.

In operation, when the counter shaft 9 is continuously roatated, the lubricating oil stored in the transmission case 1 is lifted so as to be supplied to the areas to be lubricated. In the prior art, less lubricating oil is supplied by the first counter gear 10 than the other counter gears due to its smaller diameter. According to the preferred embodiment, however, the lubricating oil lifted by rotation of the first counter gear 10 is allowed to pass through the oil passage 18 defined between the outer circumference of the first counter gear 10 and the oil guiding rib 16. Accordingly, the lubricating oil may be effectively supplied to the upper portion of the transmission case 1 without being scattered to undesired areas. As a result, it is possible to maintain satisfactory lubrication in the gear transmission by means of the small diametrical first counter gear 10 in concert with other counter gears.

Having thus described the preferred embodiment of the invention, it should be understood that numerous structural modifications and adaptations may be employed without departing from the spirit of the invention.

What is claimed is:

1. A dual-shaft type gear transmission comprising:
   an intermediate plate arranged between a transmission case and an extension housing;
   an output shaft;
   a counter shaft arranged in said transmission case in parallel relation to and below said output shaft, said counter shaft including at least two counter gears of varying diameters, the smallest diameter counter gear being arranged in the vicinity of said intermediate plate; and
   an oil guiding rib formed on said intermediate plate along an outer circumference of and spaced a predetermined distance from said smallest diameter counter gear.

2. A lubrication mechanism as defined in claim 1, wherein said oil guiding rib is formed integrally with said intermediate plate.

3. A lubrication mechanism as defined in claim 1, wherein said oil guiding rib is formed in a sectionally arcuate shape extending from a position corresponding to a lowermost point of said counter gear having the smallest diameter to a position at substantially a right angle to said lowermost point.

4. A lubrication mechanism as defined in claim 1, wherein said oil guiding rib is extended from a shaft support boss for a reverse idler gear shaft.

* * * * *